M. SIDON.
DRILL.
APPLICATION FILED FEB. 10, 1913.

1,079,906.

Patented Nov. 25, 1913.

Maximilian Sidon, Inventor

Witnesses
E. J. Marshall.
Francis P. ...

By John H. Holt
his Attorney

UNITED STATES PATENT OFFICE.

MAXIMILIAN SIDON, OF NEW YORK, N. Y., ASSIGNOR TO SMITH & HEMENWAY CO., INCORPORATED, OF NEW YORK, N. Y., A CORPORATION OF NEW YORK.

DRILL.

1,079,906.  Specification of Letters Patent.  Patented Nov. 25, 1913.

Application filed February 10, 1913.  Serial No. 747,476.

*To all whom it may concern:*

Be it known that I, MAXIMILIAN SIDON, a subject of Austria, residing at New York city, in the county of New York and State of New York, have invented certain new and useful Improvements in Drills, of which the following is a specification.

While this drill may be used for boring into various substances, the primary object of the invention is to replace the expensive diamond drills now in use for boring holes in glass.

The problem of replacing the diamond drill for such work has long since been a live one. Usually a steel file ground to a point and used with turpentine is recommended, but my experience in this line of work has taught me that drilling glass with file drills is unsatisfactory from many standpoints.

I have demonstrated, however, that the present tool will very successfully do the work of a diamond drill in glass boring and has the added advantage of being very simple and inexpensive.

Figure 1:
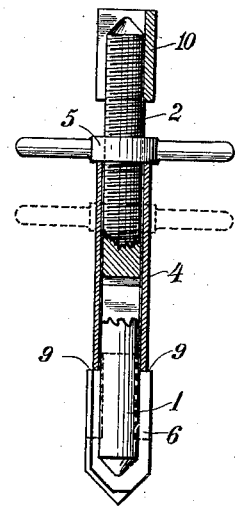
Figure 2:
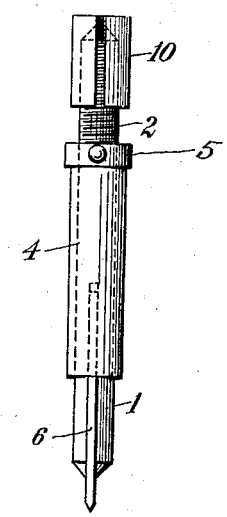
Figure 4:
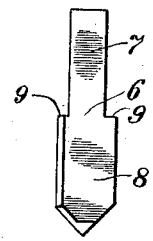
Figure 3:
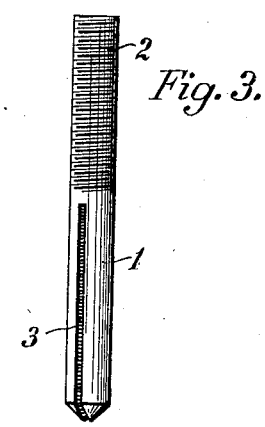

In order to more fully describe my said invention, reference will be had to the accompanying drawings wherein, Figure 1, is a central longitudinal section partly in elevation of one form of drill embodying my invention; Fig. 2, a side elevation thereof; Fig. 3, a side elevation of the stem constituting one of the elements of the drill shown in the preceding views; Fig. 4, a side elevation of one of the drill blades, and Fig. 5, a side elevation partly in section, showing a modification of the drill holding elements shown in Figs. 1 and 2.

Referring to the accompanying drawings, and first more especially to Figs. 1 to 4 thereof, my invention as therein shown comprises, among other parts, a body or stem 1, screw-threaded exteriorly as at 2 from one end along a portion of its length, and provided with a longitudinal slot 3 opening through its opposite end as shown. On this stem is carried, in the form of my invention shown in Figs. 1 and 2, a sleeve 4, longitudinally movable on said stem. The upper end of this sleeve is adapted to be engaged by a follower 5 screw-threaded on the stem 1 and adapted to effect relative longitudinal movement between said stem and sleeve for purposes which will hereinafter more fully appear.

The drill point or cutting element comprises a thin blade 6, preferably of hardened tool steel, as thin as practical for the size of the blade. This blade has a shank 7, and a cutting head 8 wider than the shank and forming shoulders 9 between the two. In use, this blade is inserted in the slot 3, the shank 7 extending within the sleeve 4 and one end of the latter engaging the shoulders 9, the slotted portion of the stem 1 beyond or outside the sleeve 4, extending along opposite faces of the drill blade and preferably over the greater portion of the length of the cutting head so as to reinforce the latter, the said portion of the stem being narrower or of lesser diameter than the width of the cutting head of the blade. The blade 6 fits the slot 3 sufficiently tight for the friction between the stem and blade to prevent the blade from falling out of the stem, without any additional holding or clamping means. The blades are held against lateral movement by the sleeve 4 engaging the edges of the shank 7. In the case shown these blades are ground with oppositely beveled side edges and oppositely beveled end edges, the latter converging to a point as shown. I do not, however, limit my invention to any special form of cutting edges.

I preferably provide the stem, in case it is screw-threaded at its upper end, with a slotted cap 10 which enters the drill chuck and protects the threads on the stem.

In operation the cap 10 is clamped in the chuck and rotating motion transmitted to the drill blade through the stem 1.

As the blades become dull they are ground, and from being thus ground from time to time, the cutting head becomes shorter. This shortening of the cutting head, however, may be compensated for by simply turning the follower 5 which, acting through sleeve 4, forces the blade out the desired amount.

Figure 5:
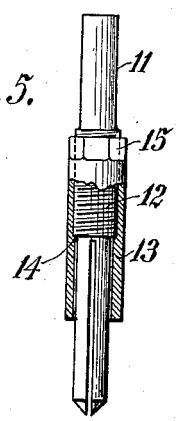

In Fig. 5 I have shown a modification of the stem and sleeve shown in Figs. 1 and 2. In the construction of Fig. 5 the stem has a plane shank 11 for insertion in the drill chuck, and a special thread 12 cut on a slightly elevated portion of the stem, the sleeve 13 being interiorly screw-threaded for engagement with threads 12 for a part of its length, and having a shoulder 14, limiting its movement on the stem in one direction, said sleeve having a hexagonal portion 15 by which it is adjusted.

It will be seen that the blade is covered or reinforced nearly its entire length, thereby permitting the use of very thin blades without becoming twisted or broken, and it is quite an advantage to be able to use such thin blades, since they present a very narrow cutting edge to be ground in sharpening. Moreover, such blades offer but little friction and a long lasting cutting edge. The stem which extends over the cutting head being narrower than said head may readily enter the hole bored thereby, and still allow the chips to leave the drill hole. Another advantageous feature of my drill is the simple way in which the blade is held, permitting the drill blades to be removed by simply pulling them out with the finger tips. Such drill, moreover, will stand repeated sharpening without replenishing the blades by virtue of the arrangement for feeding the blade forward or out at one end of its holder.

While I have herein shown and described certain specific embodiments of my invention, variations thereof may be made and still be within the scope of the claims.

What I claim is:

1. A drill comprising a stem member, a sleeve member thereon, one of said members being slotted longitudinally, means to effect relative longitudinal movement between said members, a drill inserted in said slot and having a shoulder engaged by one of said members to feed the drill forward in said slot.

2. A drill comprising a slotted stem constituting a holder, a shouldered drill blade inserted in said slot, and a sleeve on said stem movable longitudinally thereof and adapted to engage the shoulder of said blade to feed the blade forward.

3. A drill comprising a stem member, a sleeve member thereon, one of said members being slotted longitudinally, means to effect relative longitudinal movement between said members, a drill having a cutting head, a shank, and shoulders between the two, and inserted in said slot, the shank extending into said sleeve and the shoulders engaged by said sleeve to feed the drill forward, said sleeve extending on to the cutting head of the drill and engaging opposite sides thereof, and of lesser width than said drill.

4. A drill comprising a stem having a slot extending longitudinally and opening through one end thereof, a sleeve on said stem adapted to extend over said slot, means to effect relative longitudinal movement between said stem and sleeve, a drill comprising a blade having a cutting head, a shank, and shoulders formed between the two, said blade being inserted in said slot, the said shank extending into the sleeve and one end of the sleeve engaging the shoulders of said blade to feed the latter forward, the sleeve extending along opposite sides of the cutting head and of lesser width than said head.

In testimony whereof I affix my signature in presence of two witnesses.

MAXIMILIAN SIDON.

Witnesses:
ABRAHAM SHICK,
JEROME ANDERSON.

Copies of this patent may be obtained for five cents each, by addressing the "Commissioner of Patents, Washington, D. C."